United States Patent [19]

Brandt et al.

[11] Patent Number: 5,321,978

[45] Date of Patent: Jun. 21, 1994

[54] METHOD AND APPARATUS FOR DETECTING CYLINDER MISFIRE IN AN INTERNAL COMBUSTION ENGINE

[75] Inventors: Arnold W. Brandt, Livonia; Daniel V. Orzel; Jeffrey Koncsol, both of Westland, all of Mich.

[73] Assignee: Ford Motor Company, Dearborn, Mich.

[21] Appl. No.: 43,121

[22] Filed: Apr. 5, 1993

[51] Int. Cl.$^5$ .......................................... G01M 15/00
[52] U.S. Cl. ................................................... 73/116
[58] Field of Search ................ 73/35, 115, 116, 117.3; 123/425, 435

[56] References Cited

U.S. PATENT DOCUMENTS

| | | | |
|---|---|---|---|
| 4,232,545 | 11/1980 | Dobler et al. | 73/35 |
| 4,359,893 | 11/1982 | Kizler et al. | 73/115 |
| 4,444,172 | 4/1984 | Sellmaier et al. | 123/425 |
| 4,543,936 | 10/1985 | Gardner et al. | 123/475 |
| 4,547,734 | 10/1985 | Spaude | 324/395 |
| 4,795,979 | 1/1989 | Kreft et al. | 324/379 |
| 5,045,796 | 9/1991 | Bentel et al. | 324/399 |
| 5,087,882 | 2/1992 | Iwata | 324/388 |
| 5,180,984 | 1/1993 | Murata et al. | 123/425 |
| 5,207,200 | 5/1993 | Iwata | 123/425 |
| 5,221,904 | 6/1993 | Shimasaki et al. | 324/378 |

Primary Examiner—Robert Raevis
Attorney, Agent, or Firm—Roger L. May; Allan J. Lippa

[57] ABSTRACT

Provided is a method and circuit for detecting cylinder misfire in an internal combustion engine having an ignition system including an ignition device, an ignition coil having a primary and a secondary winding, and a pair of spark plugs having respective gaps. As disclosed, the circuit is operative to separate spark current and ionization current to improve detection of cylinder misfire. The circuit includes power supply means for supplying voltage to the circuit to generate ion current across the spark plug gaps and voltage limiting means for isolating said power supply means from said ignition coil. There is also included negative voltage clamping means in electrical contact with the ignition coil secondary winding for clamping selected negative voltages generated during ignition.

4 Claims, 3 Drawing Sheets

METHOD AND APPARATUS FOR DETECTING CYLINDER MISFIRE IN AN INTERNAL COMBUSTION ENGINE

TECHNICAL FIELD

This invention relates generally to cylinder misfire detection systems. More particularly, this invention relates to a method and apparatus for separating spark current and ionization current in a spark-ignition internal combustion engine to improve measurement of ionization current and more accurately detect cylinder misfire conditions.

BACKGROUND OF THE INVENTION

Automotive manufacturers and designers have long understood the relationship between spark plug gap ionization current and engine misfire. Specifically, it is known that the electrical conductivity within a spark plug gap increases following successful ignition due to the ionization of hot combustion gases. Thus, if a voltage on the order of 90 to 400 volts is impressed in the gap following ignition and the ionization current is measured, a high current flow is known to indicate combustion. A low or zero current flow is similarly known to indicate a misfire condition.

To generate the ionization current sought to be measured, prior art detection circuits have utilized an additional power source coupled to the primary and secondary windings of the vehicle ignition system coils. As those skilled in the art will recognize, however, such designs have generally proven unreliable and thus impractical for on-board detection system use because of the presence of high negative voltages which are inherently produced as a result of the spark event. To address this inherent problem, prior art detection systems have further incorporated complicated signal processing components. See, for example, U.S. Pat. No. 4,547,734 issued to Spaude, which discloses a misfire detection system which utilizes capacitance coupling to the spark plug leads. Spaude also discloses high pass filtering which is inherently susceptible to system noise to detect sharp voltage transitions resulting from ionization breakdown. These components, such as disclosed in Spaude and other prior art detection circuits and methods, unfortunately have only slightly improved the already imprecise method of ionization current measurement while adding substantial cost and complexity to the systems on the whole.

DISCLOSURE OF THE INVENTION

The present invention overcomes the difficulties of the prior art by providing a simple method and circuit for separating spark current and ionization current so as to improve detection and measurement of ionization current and thus detect cylinder misfire conditions.

It is therefore a general object of the present invention to provide a circuit for detecting cylinder misfire in a spark-ignition internal combustion engine.

A more specific object of the present invention is the provision of a method and circuit for separating spark current and ionization current in a spark-ignition internal combustion engine to improve detection and measurement of ionization current and more precisely detect cylinder misfire conditions.

In accordance with the invention, there is provided an apparatus for use in an internal combustion engine having an ignition system including an ignition device and an ignition coil having a primary and a secondary winding. Each of the ignition coil windings has a positive and negative terminal corresponding to a pair of spark plugs which are provided in electrical contact therewith. Each of the spark plugs further have a corresponding gap which, as described above, permits the flow of ionization current during combustion.

According to the invention, there is disclosed power supply means for impressing a sufficient voltage between said spark plug gaps to generate ion current following ignition. Voltage limiting means is further provided in electrical contact with the power supply means and the positive terminal of the secondary winding of the ignition coil for isolating the power supply means from the ignition coil and protecting the power supply means from high-ignition voltages. Still further, there is provided negative voltage clamping means in electrical contact with the positive terminal of the secondary winding of the ignition coil for clamping selected negative voltages generated by the spark plugs during ignition.

In accordance with the invention, the method of detecting cylinder misfire disclosed herein includes the provision of power supply means for generating post-ignition ion current across the respective gaps of the ignition system spark plugs during combustion. Voltage limiting means is also provided as disclosed above for isolating the power supply means from the ignition coil. The voltage limiting means also protects the power supply means from high-ignition voltages. Selected negative voltages generated by the combination of the coil and the spark plugs during ignition are thereafter clamped so as to separate spark current and ionization current. Finally, the ionization current is measured so as to detect engine misfiring conditions.

BRIEF DESCRIPTION OF THE DRAWINGS

These and other objects and advantages of the present invention will become apparent from the following description when taken in conjunction with the accompanying drawings in which.

BEST MODE FOR CARRYING OUT THE INVENTION

Figure 1:
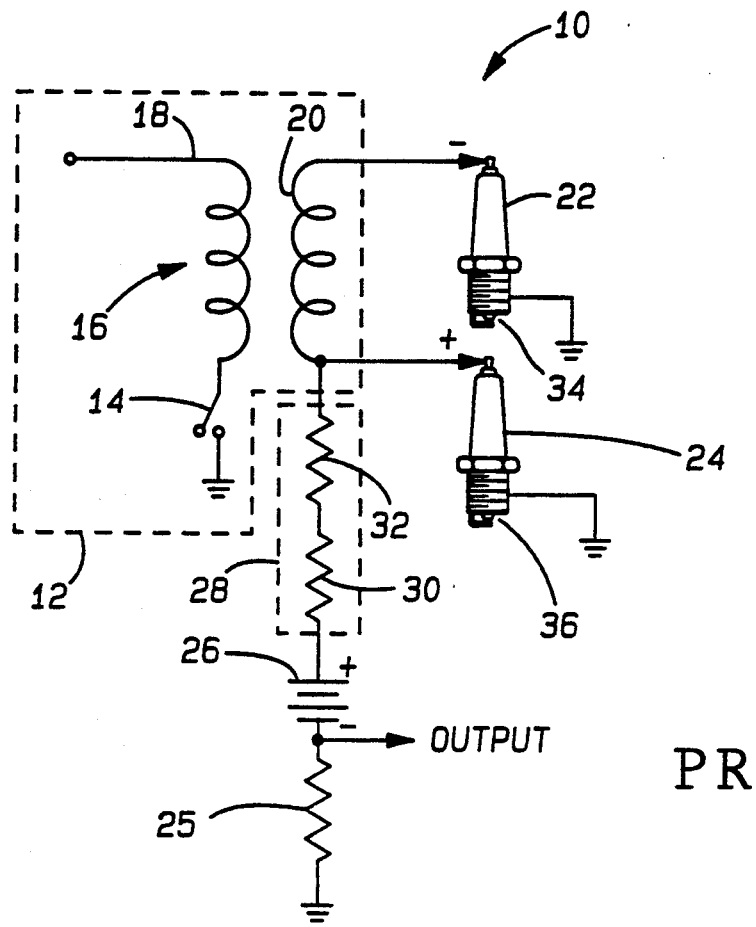
FIG. 1 is a circuit schematic of a prior art ionization current detection circuit for use in a distributorless ignition system.

With reference to FIG. 1 of the drawings, there is shown a prior art ionization current detection system generally designated by reference numeral 10. Prior art detection circuit 10 includes an ignition system 12 which may comprise, for example, a switch 14 and an ignition coil 16. Ignition coil 16 includes a primary winding 18 and a secondary winding 20. Prior art circuit 10 further includes a pair of spark plugs 22 and 24 each in electrical contact with respective terminals of the secondary winding 20 of ignition coil 16. Those skilled in the art will readily see that spark plug 22 fires on a negative voltage whereas spark plug 24 fires on a positive voltage.

Still referring to FIG. 1, there is further shown power supply means 26 which may include, for example, a 150 volt power source as shown and voltage limiting means 28 which may comprise, for example, a pair of series connected resistors 30 and 32. As seen, power supply means 26 is provided to generate ion current across the respective spark plug gaps 34 and 36 of spark plugs 22 and 24 following ignition. A current sense resistor 25 of about 10k ohms provides an output voltage proportional to the ion current. Similarly, voltage limiting means 28 is provided to isolate the ion detection part of the circuit from the coil circuit. Voltage limiting means 28 also functions to protect power supply 26 and the ion detection part of the circuit from large ignition voltages generated by secondary winding 20. Series resistors 30 and 32 each have a resistance of about 10M ohms. A pair of resistors are employed rather than a single resistor to prevent arcing across the resistor leads. Resistors 30 and 32 are preferably encapsulated to further inhibit arcing.

Figure 2:
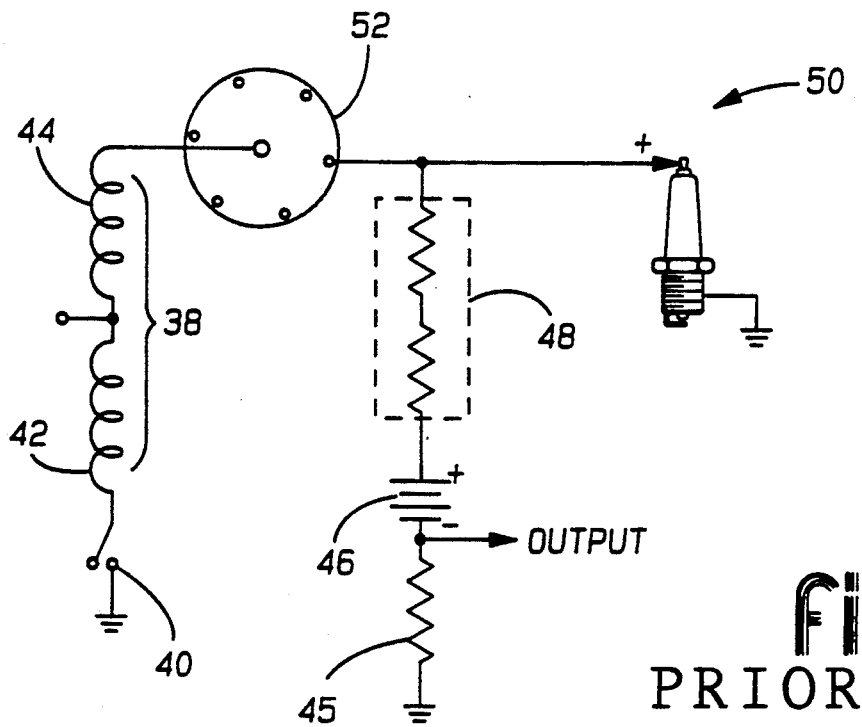
FIG. 2 is a circuit schematic of a prior art ionization current detection circuit for use in an ignition system which includes a distributor.

With reference now to FIG. 2, there is shown another prior art ionization current detection circuit which, as readily seen, is provided for use with an ignition system that includes a distributor. Like the prior art distributorless system, the detection circuit shown in FIG. 2 also includes an ignition coil 38 having an ignition switch 40 and a primary and secondary winding 42 and 44. The circuit of FIG. 2 further includes power supply means 46 and current-sense resistor 45 as well as voltage limiting means 48 and, of course, a plurality of spark plugs 50 associated with distributor 52.

Figure 3:
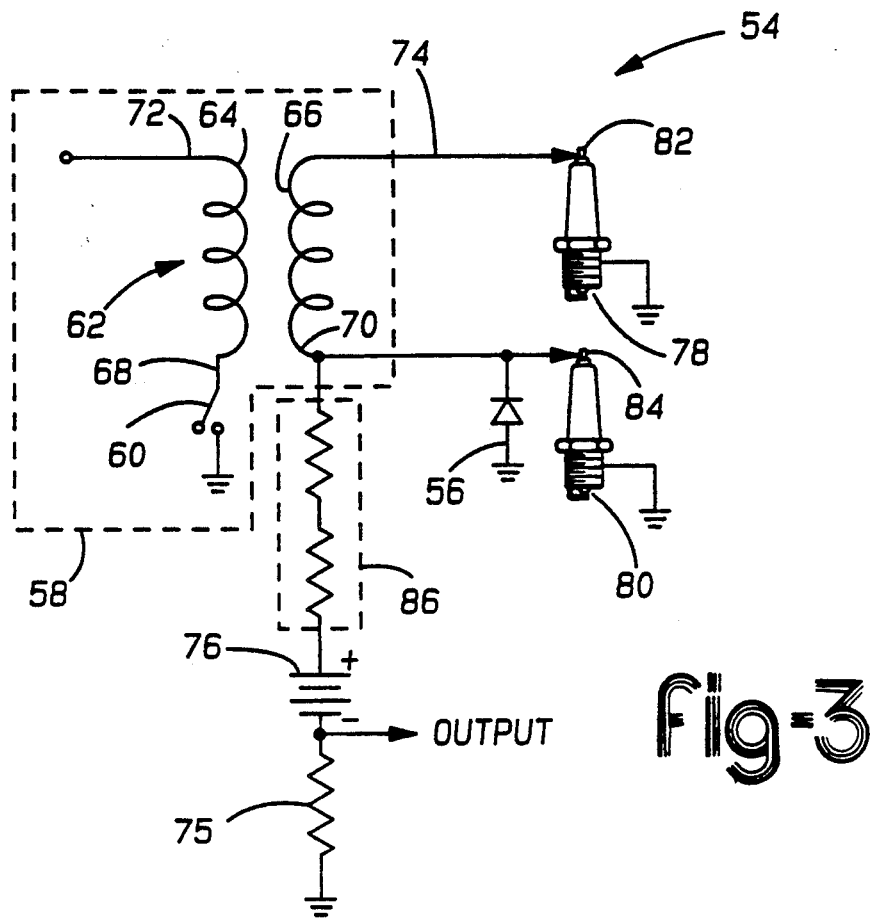
FIG. 3 is a circuit schematic of the apparatus of the present invention shown for use with a distributorless spark-ignition internal combustion engine.

In each of the prior art systems, ionization current is sought to be detected. Yet, the effects of high negative voltages generated by the spark event have rendered proper measurement difficult without resort to complex signal processing. As shown in FIG. 3, the circuit of the present invention designated generally by reference numeral 54 overcomes the difficulties of the prior art through the provision of high voltage clamping means such as clamping diode 56 which prevents the generation of undesirable high negative output voltages (excluding microseconds long transients) resulting from the spark effect.

As in the prior art, the circuit of the present invention includes an ignition system 58 having an ignition switch 60 as well as an ignition coil 62 which includes respective primary and secondary windings 64 and 66. Each of the ignition coil windings 64 and 66 further include respective positive and negative terminals. As shown in FIG. 3, the positive terminals of primary and secondary windings 64 and 66 are designated by reference numerals 68 and 70, respectively. Similarly, the negative terminals of primary and secondary windings 64 and 66 are designated by respective reference numerals 72 and 74. Positive and negative terminals as used herein refers to the polarity of ring-back voltage during a spark event.

Still referring to FIG. 3, the circuit of the present invention further includes power supply means 76 for supplying voltage to the circuit to generate ion current across the respective gaps 78 and 80 of spark plugs 82 and 84. As seen, spark plugs 82 and 84 are provided in electrical contact with terminals 74 and 70 of the secondary winding 66 of ignition coil 62. The circuit of the present invention, like the prior art, also includes current sense resistor 75 and voltage limiting means 86 in electrical contact with power supply means 76 and the positive terminal 70 of the secondary winding 66 of ignition coil 62 for isolating the ion detection part of the circuit from the ignition coil part of the circuit. As those skilled in the art will recognize, if the voltage limiting means were not present, the ignition voltage would be reduced to such a low level that spark plugs 82 and 84 would not ignite. Voltage limiting means 86 is further provided to protect power supply means 76 and the ion detection circuit from the spark plug-coil secondary voltage. It should be noted that although a short circuit could be used to replace voltage limiting means 86 to greatly reduce the coil secondary voltage, there would still be sufficient voltage generated to damage the low voltage circuits. As shown in FIG. 3, the circuit components disclosed provide a voltage divider to protect the low voltage circuit from a potentially damaging high voltage generated from the coil secondary.

Finally, there is provided high voltage clamping means such as a clamping diode 56 as shown in electrical contact with the positive terminal 70 of the secondary winding 66 of ignition coil 62 for clamping selected negative voltages (greater than a diode drop) generated by coil and spark plugs 82 and 84 during ignition. In operation, clamping diode 56 prevents the generation of high negative output voltages due to the spark event. Low negative voltages may still, however, be generated without interference by combustion ionization current resulting from the application of the 150 V supply to the electrodes of spark plugs 82 and 84 by power supply means 76. Diode 56 preferably has a voltage rating of about 35 k volts.

In keeping with the invention, applicants have recognized that following ignition, high negative voltages result from stray circuit capacitances. If ionization is present, this negative voltage is quickly discharged. However, under misfire conditions, this high negative voltage lingers at a sufficient level to appear as ion current. With high voltage clamping means 56 present, however, only positive voltages or low negative voltages may appear at the spark plug gap. It should further be noted that, as designed, the apparatus of the present invention also permits superposition of positive voltages due to stray capacitance charge on the negative voltages expected when ion current is present. Applicants have found that this condition is tolerable due to the fact that the ion current quickly discharges stray capacitance when the current is present. Thus, the present invention permits detection of the absence of ion current as well as the detection of ion current itself.

Figure 4:
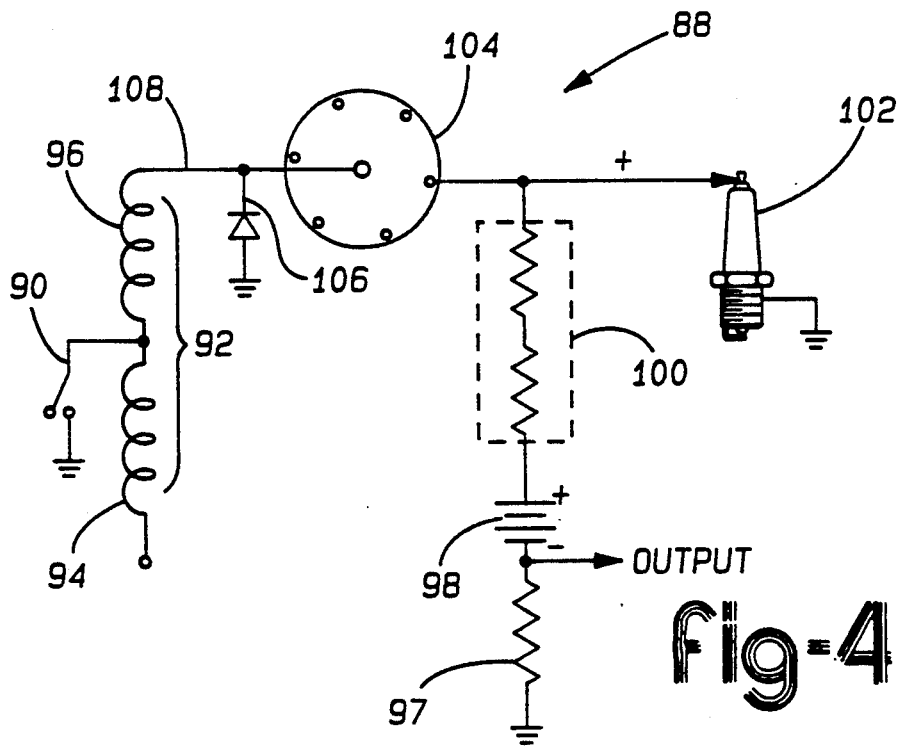
FIG. 4 is a circuit schematic of the apparatus of the present invention shown for use with a spark-ignition internal combustion engine which utilizes a distributor.

Referring now to FIG. 4 of the drawings, there is shown an alternative embodiment of the present invention directed for use with ignition systems which incorporate distributors. As shown in FIG. 4, the alternative embodiment of the apparatus of the present invention is designated generally by reference numeral 88 and, like the prior art, also includes an ignition system having an ignition switch 90, an ignition coil 92 having respective primary and secondary windings 94 and 96. The circuit further includes power supply means 98, current-sense resistor 97, voltage limiting means 100 and, of course, a plurality of spark plugs 102 in electrical contact with distributor 104. In this embodiment, the present invention further incorporates high voltage clamping means such as a clamping diode 106 as shown in electrical contact with the negative terminal 108 of secondary winding 96. Like the distributorless embodiment of FIG. 3, high voltage clamping means 106 rejects negative transients thereby permitting improved detection and measurement of ionization current.

Figure 5:
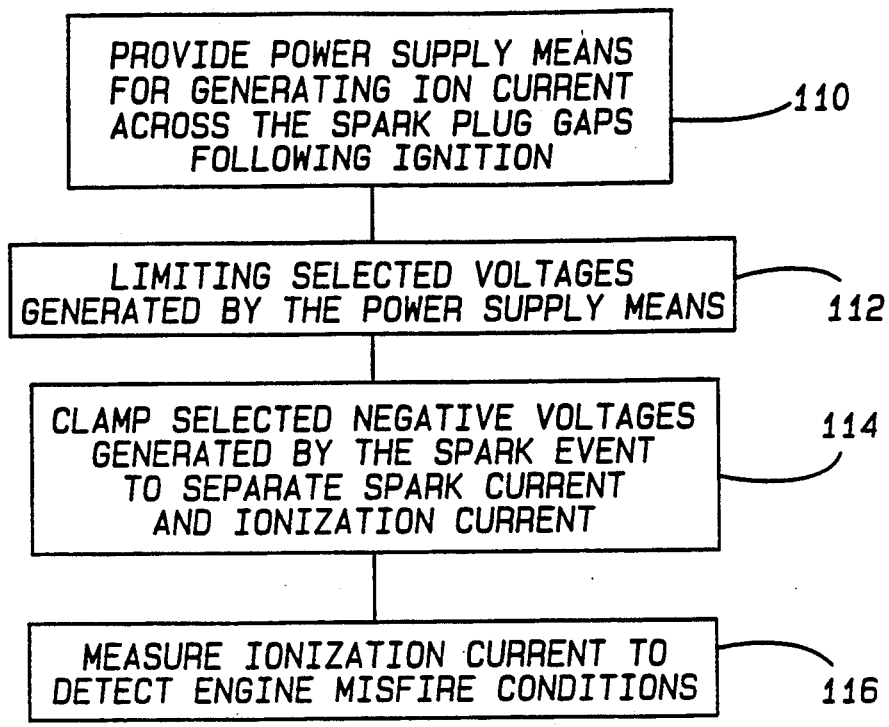
FIG. 5 is a block diagram of the method steps of the present invention.

With reference now to FIG. 5 of the drawings, the method steps of the present invention will now be discussed in further detail. Those steps include the provision of power supply means for generating ion current across the spark plug gaps following ignition as indicated in block 110. The method steps of the present invention further include limiting selected voltages generated by the power supply means to prevent the ignition system from being overloaded and to protect the power supply and the ion detection circuit part of the circuit as shown in block 112. Still further, as shown in block 114, selected negative voltages generated by the spark plugs during ignition must be clamped to separate spark current and ionization current. Finally, as shown in block 116, the ionization current is measured so as to detect the misfire condition. As referenced above, a low or zero ion current corresponds to a misfire condition.

Figure 6:
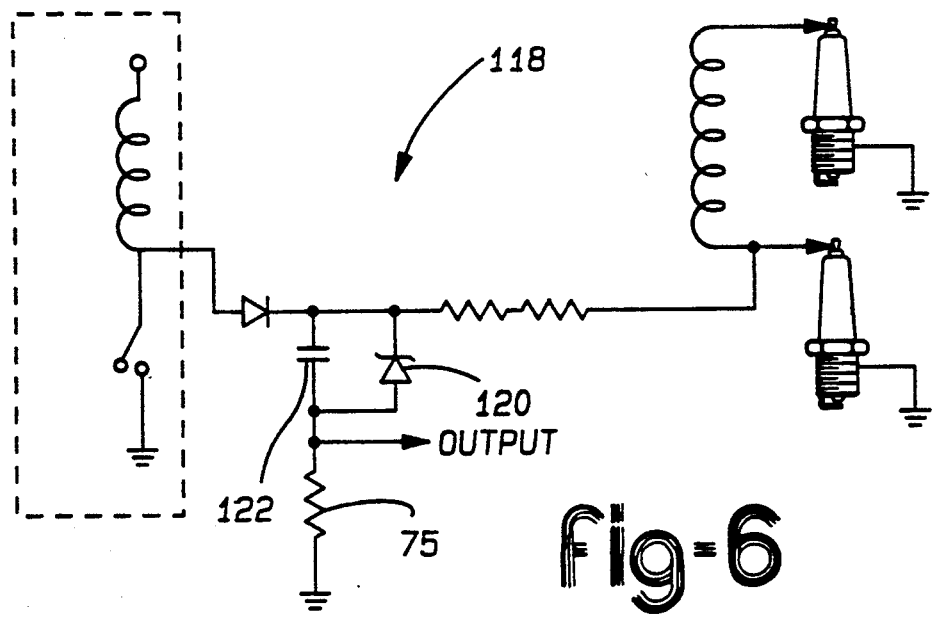
FIG. 6 is a circuit schematic of a power supply used with the apparatus of the present invention.

In each of the embodiments referenced above, it should be noted that a totally isolated power supply is neither required nor advantageous. Nor is a 150 volt magnitude power source a necessity. Applicants recognize that with improved signal-to-noise ratio (SNR) a much lower voltage may indeed be feasible. Against this background, a typical power supply of the type which may be utilized in accordance with the invention herein is shown in FIG. 6 and is designated generally by reference numeral 118. As shown in FIG. 6, power supply 118 may include, for example, a 150 volt Zener diode 120 connected in parallel with 0.47 MF capacitor 122. The remaining connections are readily apparent by further reference to FIG. 6.

While the best mode for carrying out the invention has been described in detail, those familiar with the art to which this invention relates will recognize various alternative designs and embodiments for practicing the invention as defined by the following claims.

We claim:

1. For use with an internal combustion engine having an ignition system including an ignition device, an ignition coil having a primary and a secondary winding, each winding further having a respective positive and negative terminal, a first spark plug in electrical contact with said secondary winding negative terminal and a second spark plug in electrical contact with said secondary winding positive terminal, said first and second spark plugs each having a corresponding gap and operative to fire on positive and negative voltages respectively, an apparatus adapted to improve detection of cylinder misfire, comprising:

a power supply for impressing a voltage between said spark plug gaps to generate ion current following ignition;

a pair of series connected resistors in electrical contact with said power supply and said secondary winding positive terminal for substantially isolating said power supply from said ignition coil and protecting said power supply from high ignition voltage; and a clamping diode in electrical contact with said secondary winding positive terminal, said clamping diode comprising means to prevent lingering negative voltages at said second spark plug following ignition which might be interpreted as ionization current, whereby to provide said improved detection of cylinder misfire.

2. An apparatus as in claim 1, wherein said resistors are each 10 ohms.

3. An apparatus as in claim 1, wherein said power supply is a 150 volt power source.

4. For use with an internal combustion engine having an ignition system including an ignition coil having a primary and a secondary winding, each winding further having a positive and a negative terminal, a first spark plug in electrical contact with said secondary winding negative terminal and a second spark plug in electrical contact with said secondary winding positive terminal, said first and second spark plugs each having a corresponding gap and operative to fire on positive and negative voltages, respectively, a method for detecting cylinder misfire, comprising:

providing a power supply to impress a voltage between said spark plug gaps so as to generate ion current;

substantially isolating said power supply from said ignition coil so as to protect said power supply from high-ignition voltage;

providing a clamping diode in electrical contact with said secondary winding positive terminal comprising means to prevent the appearance of lingering negative voltages at said second spark plug following ignition which might be interpreted as ionization current; and measuring ionization current.

* * * * *